May 6, 1930.    M. STILES    1,757,848
HARVESTER
Filed Oct. 8, 1927    7 Sheets-Sheet 1

Marvin Stiles,
INVENTOR
BY Victor J. Evans
ATTORNEY

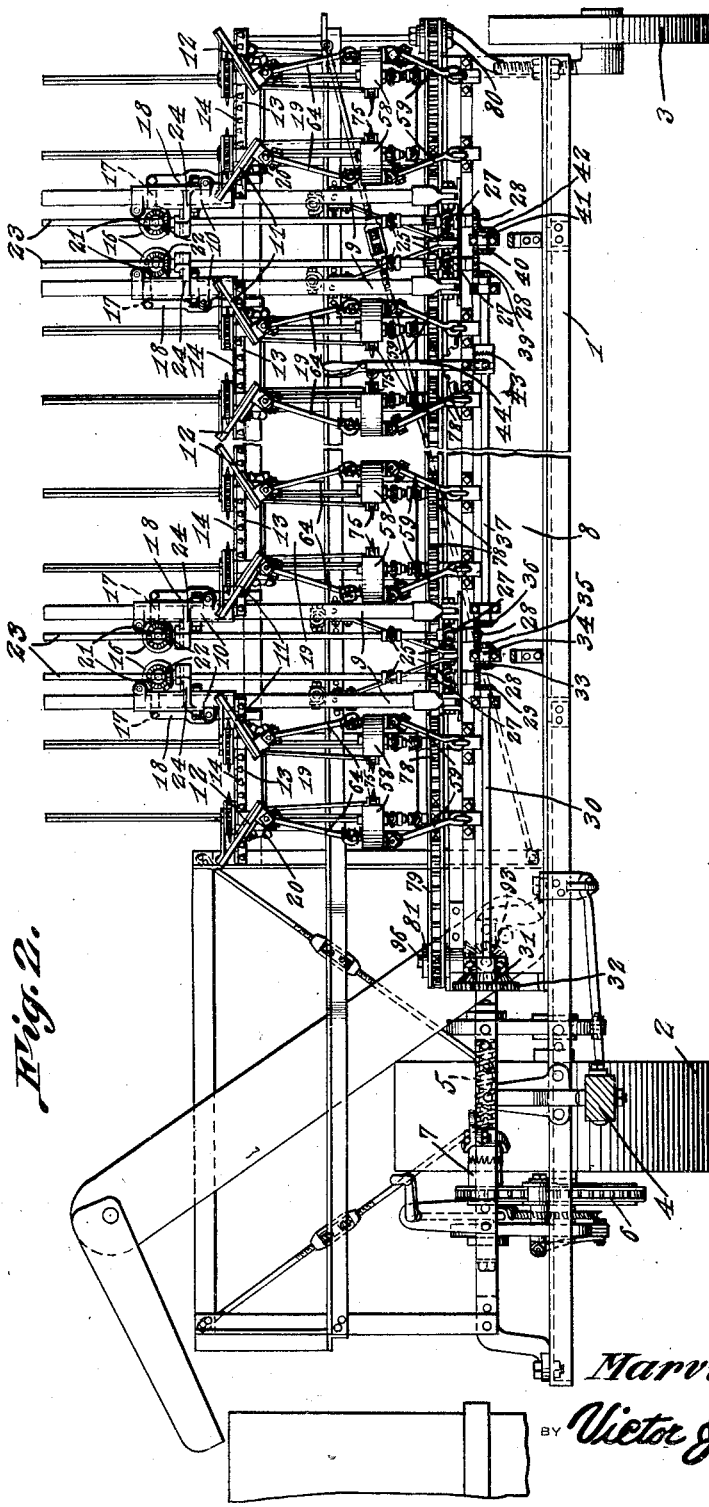

May 6, 1930.  M. STILES  1,757,848
HARVESTER
Filed Oct. 8, 1927   7 Sheets-Sheet 3
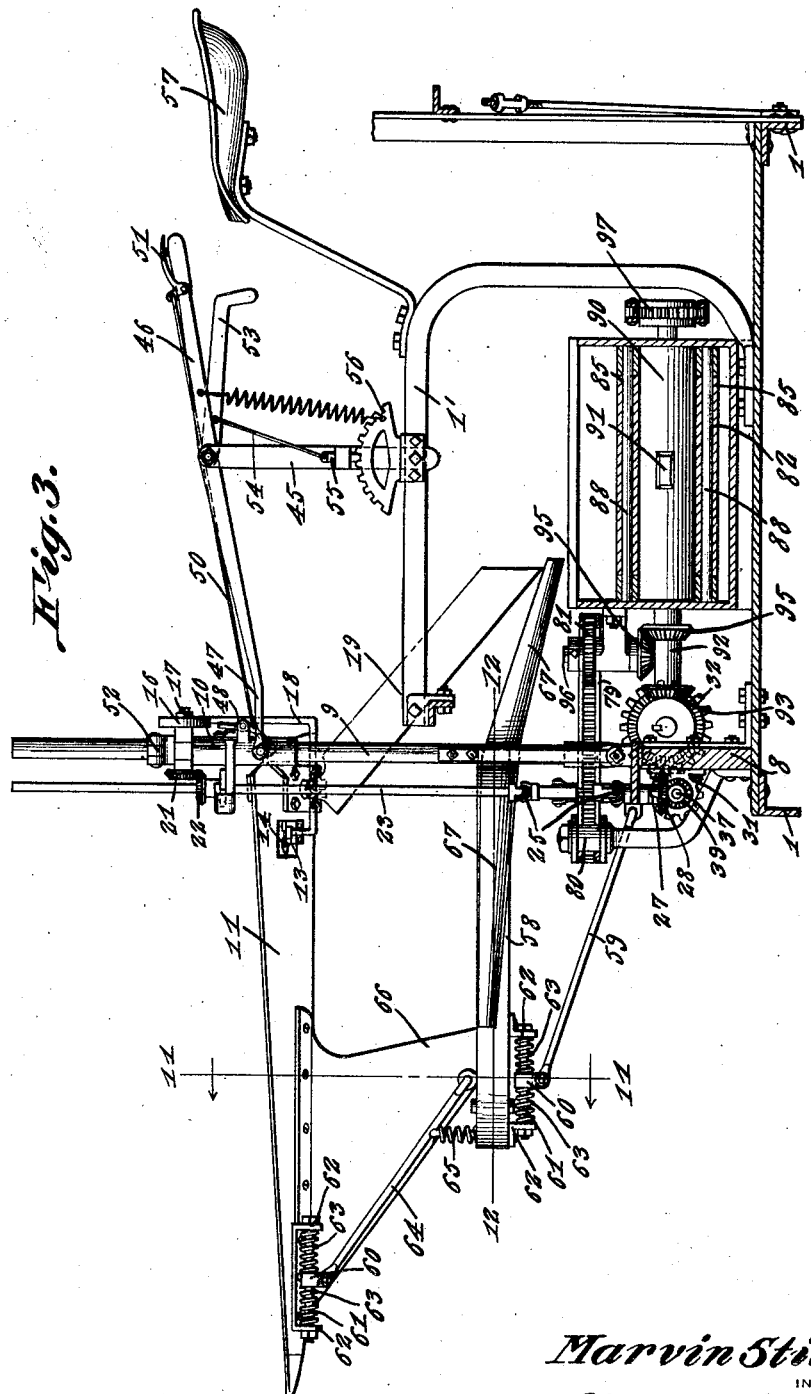
Marvin Stiles,
INVENTOR
BY Victor J. Evans
ATTORNEY

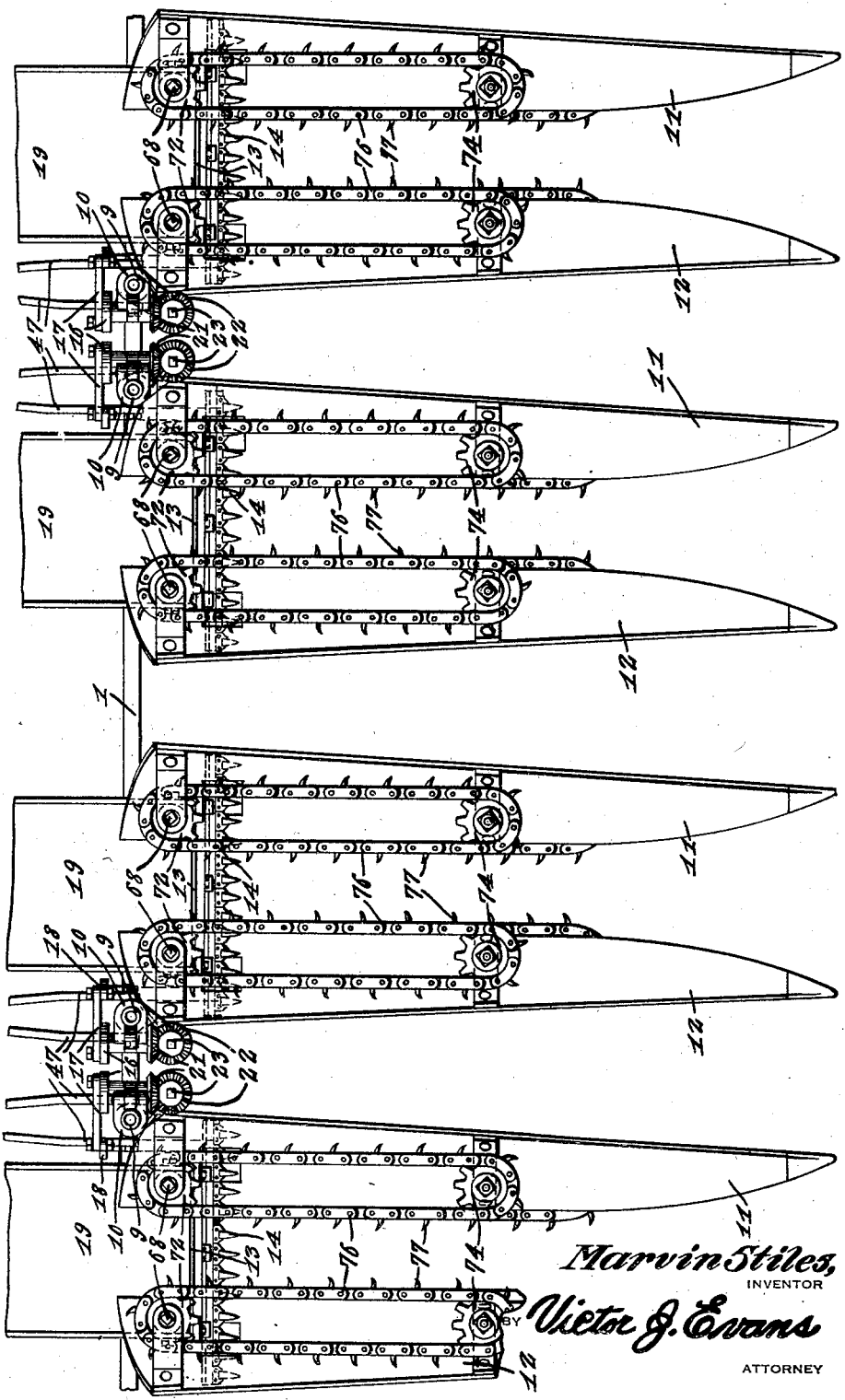

May 6, 1930.  M. STILES  1,757,848
HARVESTER
Filed Oct. 8, 1927   7 Sheets-Sheet 5
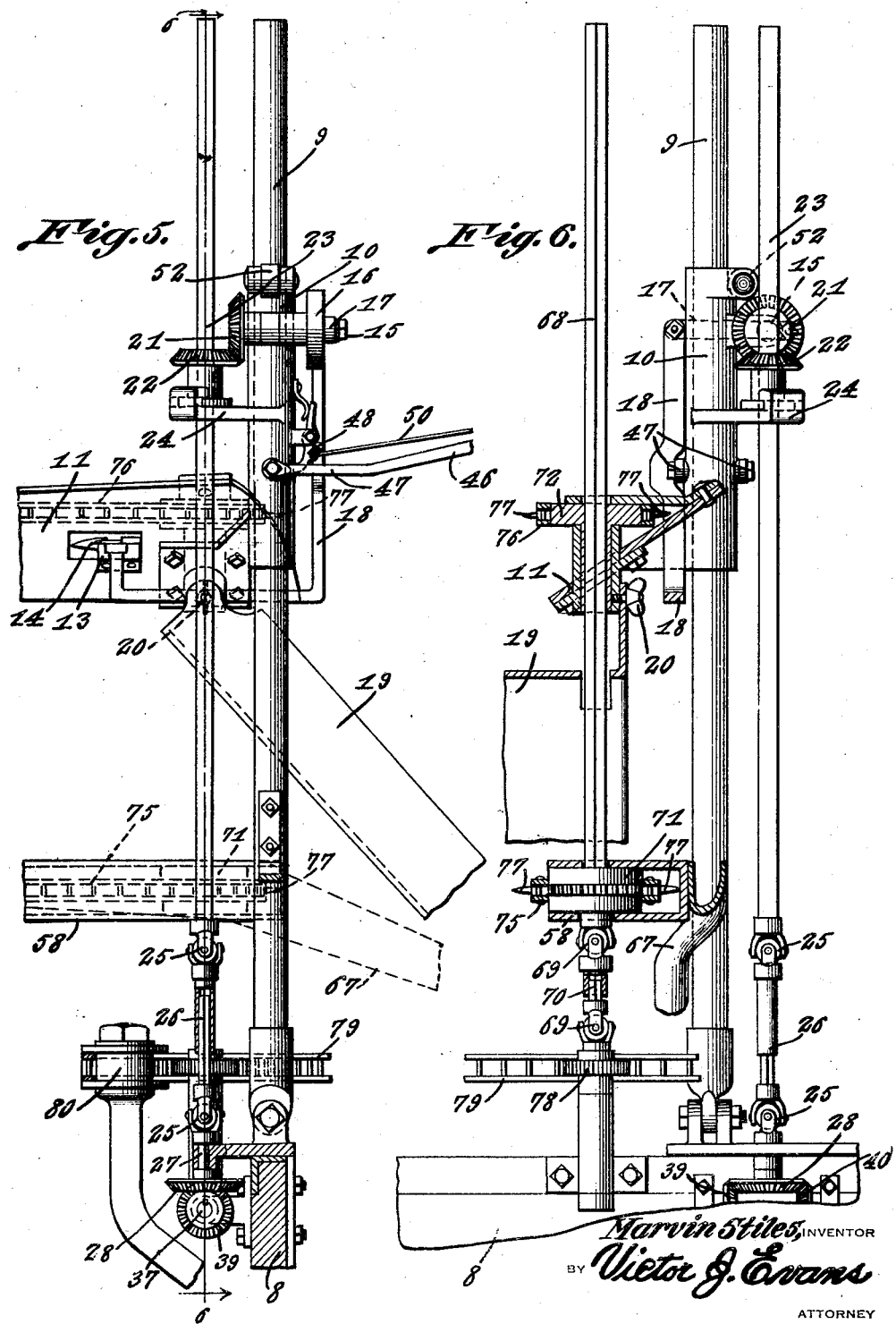

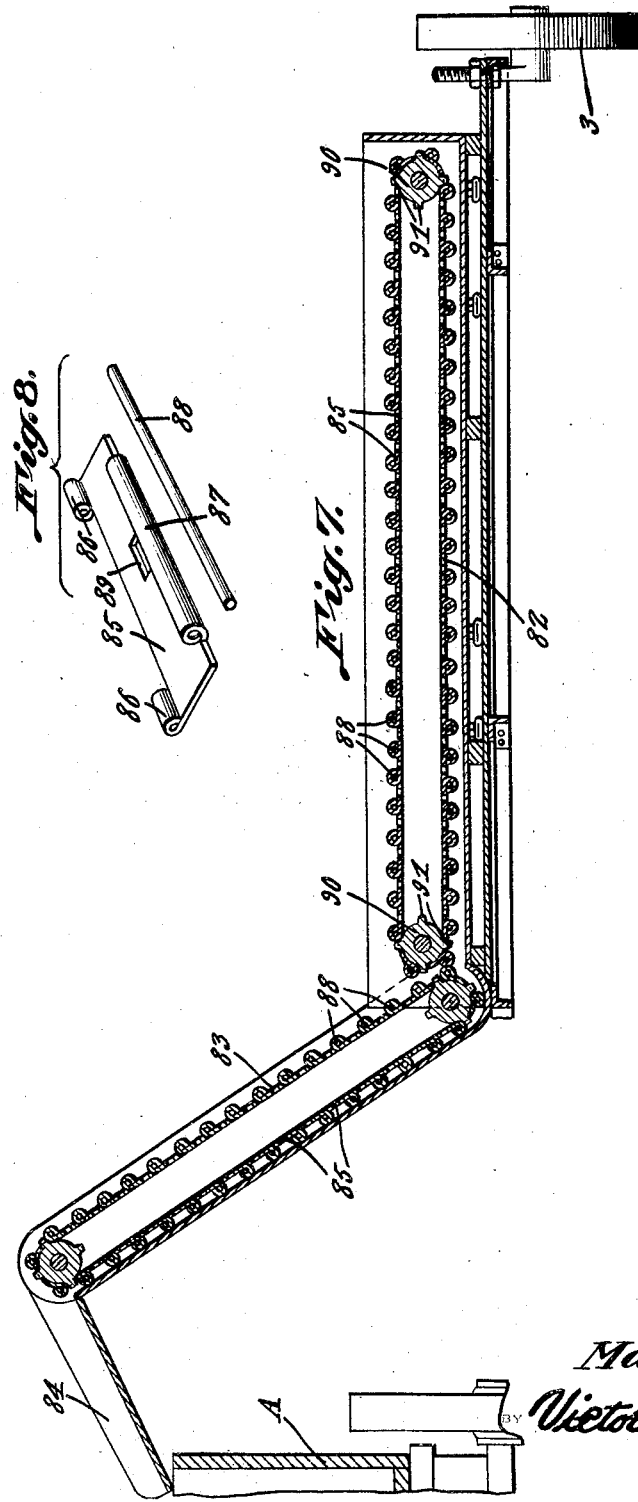

May 6, 1930.                M. STILES                1,757,848
                            HARVESTER
                     Filed Oct. 8, 1927         7 Sheets-Sheet 7
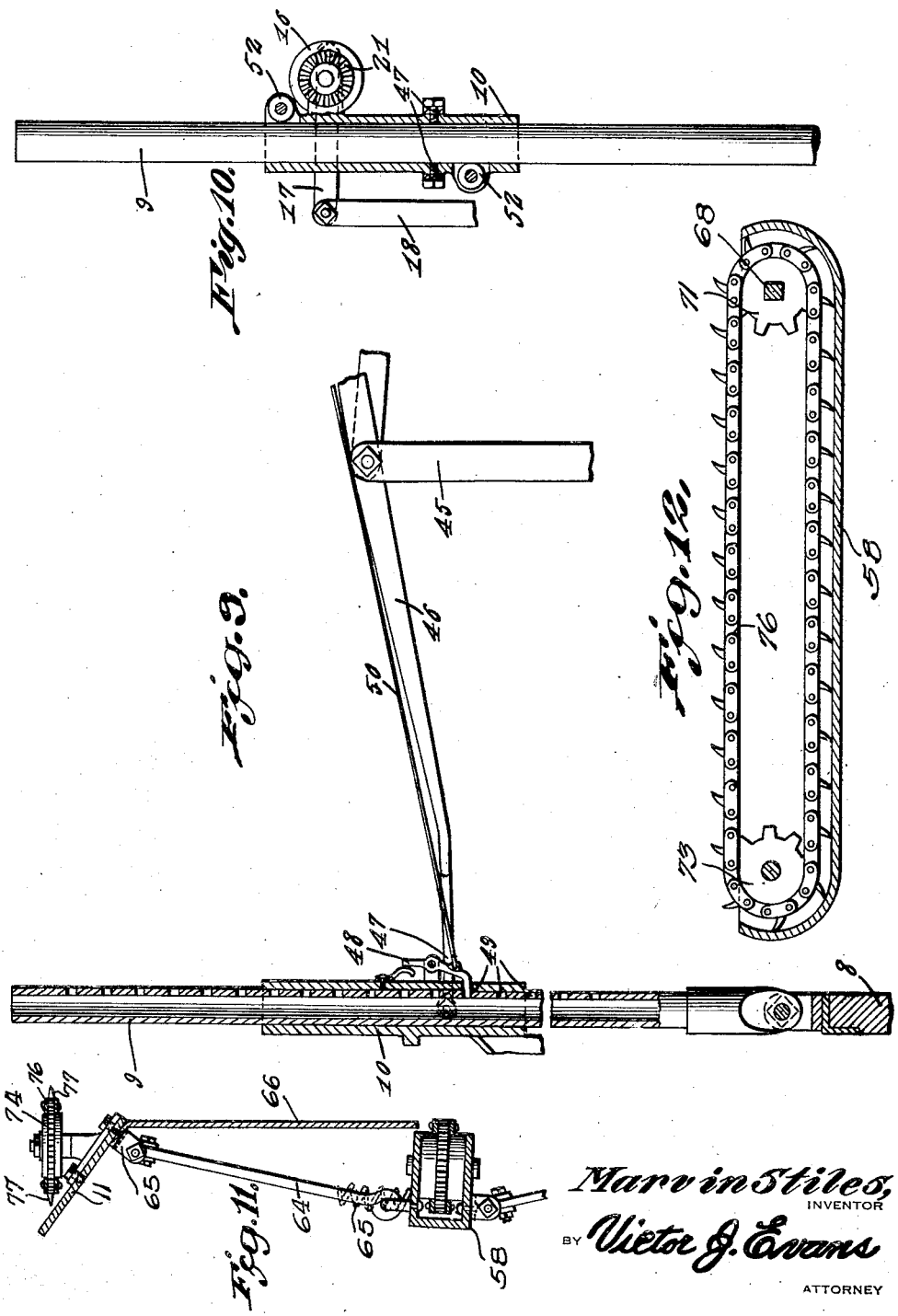

Patented May 6, 1930

1,757,848

UNITED STATES PATENT OFFICE

MARVIN STILES, OF HAMILTON, TEXAS

HARVESTER

Application filed October 8, 1927. Serial No. 224,893.

This invention relates to a header for grain planted in rows, the general object of the invention being to provide a number of cutter assemblies, one for each row, with means for permitting adjustment of each assembly independent of the others so that grain of varying heights can be headed by the machine as it travels along the rows, thus permitting all the heads to be harvested without regard to the height of the grain.

Another object of the invention is to provide an elevator, a conveyor for delivering the heads thereto, a chute connected with each cutter assembly for delivering the heads from the assembly to the conveyor and means for delivering the heads from the elevator into a wagon traveling along with the apparatus.

A still further object of the invention is to so arrange the controlling means for the cutter assemblies that a pair of such assemblies can be actuated and controlled by a single operator.

A further object of the invention is to so construct each assembly that it comprises a pair of lower stationary dividers, a pair of upper movable dividers, an endless chain carried by each divider for causing the grain to pass to the sickle, a sickle associated with each pair of upper dividers, means for operating the sickles and the endless chains and manually operated means for raising and lowering the upper dividers and the sickles and the operating means therefor.

A still further object of the invention is to provide means whereby each cutter assembly may be tilted either forwardly or rearwardly by the operator through means of a hand lever.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings, wherein like characters denote like or corresponding parts throughout the several views, and in which:—

Figure 2 is a front view.

Figure 3 is a section on line 3—3 of Figure 1.

Figure 4 is an enlarged horizontal sectional view through the upper dividers.

Figure 5 is an enlarged side elevation, with parts in section, showing the supporting post of a cutter assembly and the parts associated therewith.

Figure 6 is a section on line 6—6 of Figure 5.

Figure 7 is a longitudinal sectional view through the conveyor and elevator and the parts associated therewith.

Figure 8 is a view of one of the links of the elevator and its pin.

Figure 9 is a sectional view through one of the posts and its sleeve and showing the lever for shifting the sleeve.

Figure 10 is an elevation of the post, with the sleeve in section.

Figure 11 is a section on line 11—11 of Figure 3.

Figure 12 is a section on line 12—12 of Figure 3.

Figure 1:
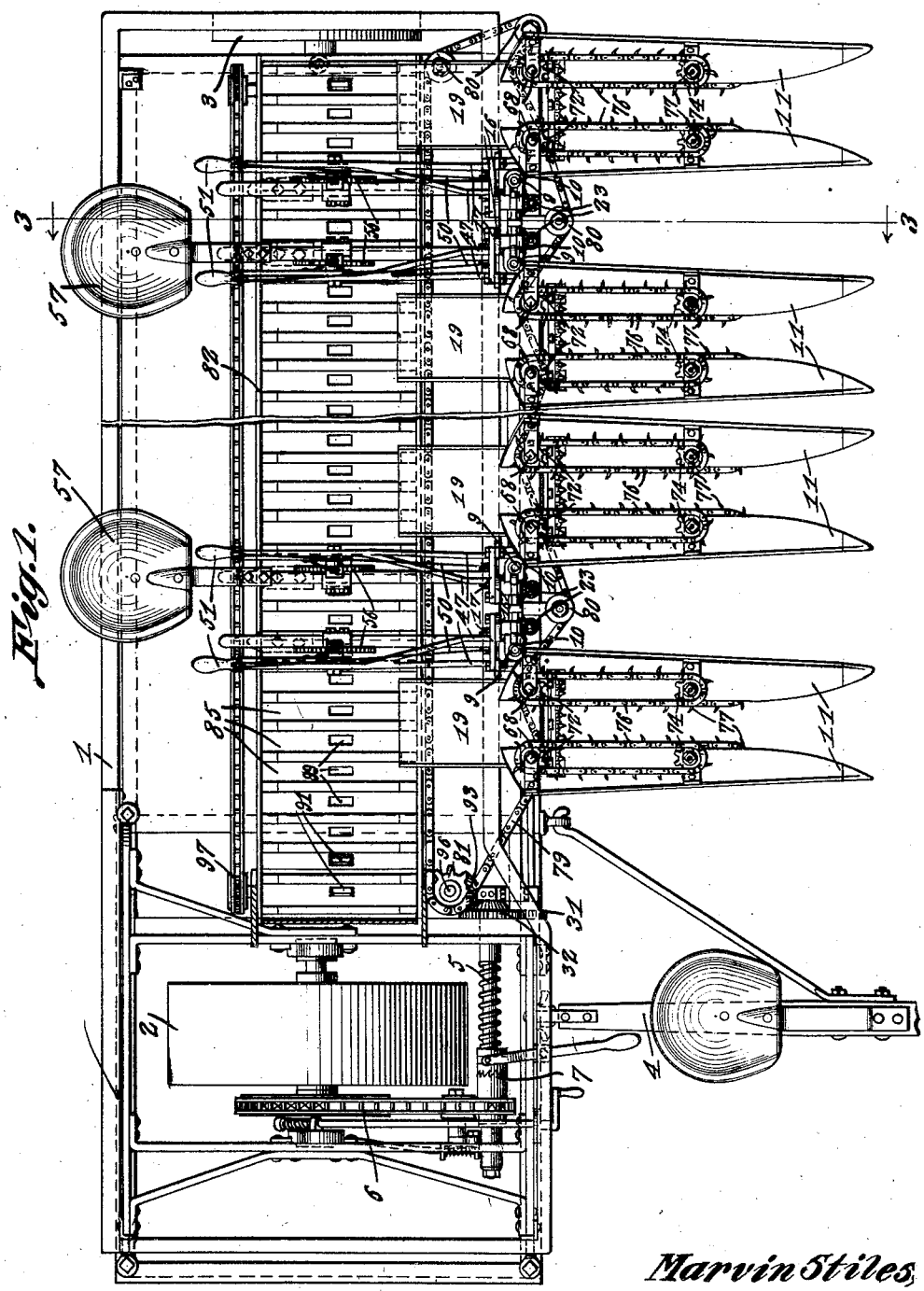
Figure 1 is a plan view of the device.

In these views, 1 indicates a frame which is supported by the wheels 2 and 3 and to the front of which the truck stub 4 is connected, a shaft 5 being driven from the main wheel 2 through means of the connections 6. This shaft is provided with clutch means 7 so that it can be connected to and disconnected from the driving connections.

The frame includes a longitudinally extending beam 8 at the front thereof, this beam supporting the parts of the headers and parts associated therewith.

A plurality of posts have their lower ends pivotally connected with the top of the beam so that the posts can rock forwardly or rearwardly, each post constituting a support for a cutter or header unit or assembly for one row of plants.

A sleeve 10 is slidably arranged on each post and each sleeve has attached thereto the rear end of a long narrow divider or barge 11, preferably formed of wood reinforced by metal. A similar divider or barge 12 is connected at its rear in spaced relation to the first divider 11 by the guide 13 for the sickle or cutter 14. A stub shaft 15 is journaled in a part of the sleeve and said shaft has a crank disk 16 on its rear end, the crank pin of which is engaged by an arm 17 to which is connected a member 18 which has its other end connected with the sickle or cutter bar so that when the shaft is turned, the member 18 will communicate the movement of the arm 17, caused by the crank pin or disk 16, to the sickle or cutter bar and thus reciprocate the same across the space between the two dividers or barges 11 and 12 and thus cut the heads off the grain passing through the said space. The heads will drop into a chute 19 which has its upper end adjustably fastened by the thumb screws 20 to the rear ends of the dividers 11 and 12 in such a manner that the heads severed by the sickle will drop into the chute, which will deliver them into a conveyor which is to be hereinafter described.

The shaft 15 is driven through means of a bevel gear 21 thereon engaging a similar gear 22 slidably mounted on a square shaft 23 which parallels the post 9 and said gear 22 is carried by an arm 24 fastened to the sleeve 10 so that the gear moves with the sleeve and therefore remains in mesh with the gear 21 during the sliding movement of the parts.

The lower part of each shaft 23 is formed with the two universal joints 25 and the telescopic joint 26 and the stub section 27 which carries the lower part of the lower universal joint is journaled in a part of the frame in front of the beam 8 and has a bevel gear 28 attached to its lower end. These bevel gears 28 of the shafts 23 are horizontally arranged and the first one, next to the main wheel 2, meshes with a bevel gear 29 on a horizontal shaft 30 which is journaled to the front of the beam 8 and which has a gear 31 on its other end which meshes with a gear 32 on the driven shaft 5. A bevel gear 33 meshes with the opposite side of the first gear 28 and is carried by a stub shaft 34 journaled on the front of the beam and this shaft has a bevel gear 35 on its other end which meshes with the gear 28 of the next shaft 23 and a gear 36 on a shaft 37 meshes with the opposite side of this gear 28 of the second shaft 23 and has a gear 39 on its opposite end which meshes with the gear 28 of the third shaft 23, this gear 28 also meshing with a gear 40 on a stub shaft 41 which has a gear 42 on its opposite end which meshes with the gear 28 of the fourth or last shaft 23. Thus all the shafts 23 are driven in the same direction from the driven shaft 5 and the rotation of these shafts 23 will, through the means described, operate the sickle or cutter bars and such bars will be operated without regard to the vertical adjustment of the sleeve and the dividers and other parts attached thereto.

In order to enable two of the units or assemblies to be rendered inactive, I provide clutch means 43 on the shaft 37 which are actuated by the hand lever 44 so that two of the cutting units can be operating while the other two are idle. Thus these will enable the machine to cut two rows at a time instead of four.

An upright 45 is pivoted at its lower end to a raised part 1' of the frame in rear of each post. A hand lever 46 is pivoted intermediate its ends to the top of the upright and has its forked front end 47 pivoted to the sleeve on each post so that by manipulating the lever 46, the sleeve can be raised or lowered. A latch 48 is pivoted to each sleeve and has one end adapted to engage any one of a number of holes 49 formed in the post so as to lock the sleeve to the post. This latch is connected by a link 50 with a pivoted part 51 on the handle of the hand lever so that when the hand lever is grasped, the part 51 is depressed, which will cause the link 50 to move the latch to releasing position. Then the sleeve can be raised or lowered by moving the hand lever in one direction or the other. The sleeve is provided with the rollers 52 to reduce friction between the sleeve and the post during the movement of the sleeve. A second hand lever 53 is pivoted to the top of each upright 45 and is connected by a link 54 with a latch 55 on the upright and said latch engages a toothed sector 56 fastened to the part of the frame 1' adjacent the upright so that by slightly raising the lever 53 to release the latch 55 and then pushing or pulling upon the lever 53, the upright 45 can be moved on its pivot and this movement will be communicated to the post and its associated parts so that the post can be tilted forwardly or rearwardly, as desired. The parts will be held in adjusted position by the latch 55.

A seat 57 is arranged on the frame between each pair of levers 46 so that one operator can manipulate two pairs of the levers 46 and 53 to control the cutting units and to tilt them forwardly or backwardly, as before described.

A second divider or barge 58 is placed a distance below each of the upper dividers or barges. These lower dividers are of much less length than the upper dividers and are stationary, as they do not move vertically as do the upper dividers. A link 59 connects each lower divider with a front part of a frame, the link being pivoted to a part of the frame at its lower end and has its upper end pivoted to a collar 60 which is movably arranged on a rod 61 supported by the brackets 62 which depend from the bottom of the outer end of each divider 58. A pair of coil springs 63 are placed on the rod, one on each side of the collar and tends to hold the collar in a central position. A link 64 connects each lower divider with the divider immediately above it, the connection of the link with the dividers being the same as that described in connection with the link 59. In addition, a spring 65 connects the lower portion of the link with the lower divider.

An apron 66, of metal or the like, is connected at its top with the lower front part of the upper divider and has its front edge tapering downwardly and inwardly, with its lower part arranged slightly above the lower divider, it being understood that the apron is not connected with the lower divider. A space is left between the inner end of the apron and the upper and lower divider so that goose-neck heads and the like, which fail to pass over the sickle, after being cut, will drop through this space and fall into the chutes 67 at the sides of the lower barges, which will convey the heads to the conveyor above referred to.

A vertical shaft 68 passes through the rear ends of each pair of upper and lower dividers or barges. The lower part of each shaft is provided with a pair of universal joints 69 and a telescopic joint 70 which is arranged between the universal joints. The lower divider or barge is of casing-like construction, with its inner side open and a sprocket 71 is arranged on the shaft and within the divider, and a sprocket 72 is slidably connected with the square upper part of the shaft and this sprocket 72 is carried by the upper divider. An idler sprocket 73 is arranged at the front end of each lower divider and an idler sprocket 74 is arranged adjacent the center of each upper divider. An endless sprocket chain 75 passes over the sprockets of each lower divider and a similar chain 76 passes over the two sprockets of each upper divider. The link of each chain is provided with a pair of fingers 77 for causing the grain to travel along with the chain.

A sprocket 78 is secured to each shaft 68 below the last universal joint therein and a sprocket chain 79 passes over these sprockets 78 and the guiding pulleys 80, after passing over the drive sprockets 81, in such a manner that the shafts 68 are so rotated that the outer stretches of the barge or divider chains move rearwardly so that these chains act to cause the grain between each set of barges or dividers to pass toward the knives or sickles.

A conveyor 82 is arranged at the longitudinal center of the frame in rear of the cutter units and is adapted to receive the heads dropping from the chutes 19 and 67. This conveyor delivers the heads to an elevator 83 from which the heads pass into a chute 84 which is intended to deliver the heads to a wagon, such as A, which travels along with the apparatus at one side thereof. The endless members of the conveyor and elevator are each composed of a plurality of links 85. Each link has a barrel 86 formed at each of its rear corners and a long barrel 87 formed at its front, with the ends of the barrels spaced from the ends of the link, the front barrel of one link fitting in the space between the rear barrels of the next link and the barrels being connected together by the hinge pins 88 which pass through the barrels. Thus it will be seen that I have provided an endless member composed of a plurality of links which are hingedly connected together, the hinge parts forming outwardly extending ribs which act to cause the heads or other material to pass along with the endless member.

Each link is provided with an opening 89 and the rollers 90, over which the endless member passes, are formed with lugs 91 for engaging these openings so that the lugs on the rollers and these openings act as sprocket means for causing the movement of one of the rollers to be communicated to the endless member.

One of the rollers 90 of the conveyor 82 has one of its pintles extended, as at 92, and this extension carries a gear 93 which meshes with a gear associated with the gear 31 of the drive shaft 5. The pintle extension is also provided with a second gear 94 with which engages a gear 95 which is attached to the stub shaft 96 which carries the driving sprocket 81 for the sprocket chain 79 which operates the shafts 68 for the chains of the barges or dividers.

The elevator is driven from the conveyor by any desired means, such for instance as those shown generally at 97.

From the foregoing it will be seen that as the machine travels along, the four cutting units or assemblies will cut the heads off of the grain of four rows at once. The sickles are driven through means of the square shafts 23 which are connected by the gears and shafting shown with the drive shaft 5 of the implement, and as the gear 22 is slidably but non-rotatably connected with the shaft 23, the cutter units can be moved vertically on their posts without interfering with the transmission of the driving motion. The feeding chains of the dividers or barges are actuated from the shafts 68, each of which passes through the rear part of each pair of dividers, these shafts also deriving their motion from the drive shaft 5 through the sprocket chain and sprockets before mentioned, and as the upper sprockets are slidably connected with the shafts 68, the upper dividers can be adjusted vertically without interfering with the transmission of motion to the chains of the upper dividers. The heads cut from the grain pass down the chutes 19 on to the conveyor from which they are carried to the elevator, which finally discharges them into a wagon traveling with the implement. Goose-neck heads, or heads dropping through the space between the upper and lower dividers and the apron, will drop into the chutes 67 at the sides of the lower dividers and these chutes will lead the heads into the conveyor. The cutting units, including the upper dividers, are adjustable vertically so that they can be adjusted to cut the heads from grain, the height of which varies. Thus the operator, by watching the two rows of grain, can raise and lower his two cutting units by means of the hand levers so as to cut the heads off tall grain as well as low grain. By tilting the units by means of the handle 53, the dividers and the chains can be made to pick up grain which is not standing straight, such as that which has been blown over, etc.

When desired, two of the units can be rendered inactive by slipping the clutch 43 so that but two rows will be cut by the machine.

This implement will enable a few men to harvest large fields of grain planted in rows, such as kaffir corn, milo, feterita and the like, the machine simply harvesting the heads and letting the straw remain in the field, and all the heads can be secured, as the machine can be adjusted to cut the heads from short grain as well as tall grain and it will take care of heads which are bent over and which are usually referred to as "goose-neck heads", and it can also be adjusted to cut the heads off grain which has been blown or knocked down.

What I claim is:—

1. An implement for heading crops planted in rows, comprising a wheel supported frame, a number of header units thereon, each unit being adapted to head the plants of a row, means for operating the cutting means of each unit and manually operated means for raising and lowering portions of each unit so as to adjust the unit to cut heads off plants of varying heights, and means for tilting each unit forwardly or rearwardly.

2. An implement for heading crops planted in rows, comprising a wheel supported frame, a number of header units thereon, each unit comprising a pair of stationary lower dividers, a pair of vertically adjustable upper dividers, endless feeding chains in the dividers, a cutter bar extending across the space between the upper dividers, manually operated means for raising and lowering the upper dividers, their chains and the cutter bar, means for actuating the cutter bar without interfering with the vertical adjustment of the upper dividers, means for actuating the feeding chains in the dividers, such means permitting vertical adjustment of the upper dividers and their chains.

3. An implement for heading crops planted in rows, comprising a wheel supported frame, a number of header units thereon, each unit comprising a pair of stationary lower dividers, a pair of vertically adjustable upper dividers, endless feeding chains in the dividers, a cutter bar extending across the space between the upper dividers, manually operated means for raising and lowering the upper dividers, their chains and the cutter bar, means for actuating the cutter bar without interfering with the vertical adjustment of the upper dividers, means for actuating the feeding chains in the dividers, such means permitting vertical adjustment of the upper dividers and their chains, and manually operated means for tilting each unit forwardly or rearwardly.

4. An implement for heading crops planted in rows, comprising a wheel supported frame, a number of header units thereon, each unit comprising a pair of stationary lower dividers, a pair of vertically adjustable upper dividers, endless feeding chains in the dividers, a cutter bar extending across the space between the upper dividers, manually operated means for raising and lowering the upper dividers, their chains and the cutter bar, means for actuating the cutter bar without interfering with the vertical adjustment of the upper dividers, means for actuating the feeding chains in the dividers, such means permitting vertical adjustment of the upper dividers and their chains, manually operated means for tilting each unit forwardly or rearwardly, a conveyor carried by the frame and means for delivering the heads cut by the cutter means on to the conveyor.

5. An implement for heading crops planted in rows, comprising a wheel supported frame, a number of header units thereon, each unit comprising a pair of stationary lower dividers, a pair of vertically adjustable upper dividers, endless feeding chains in the dividers, a cutter bar extending across the space between the upper dividers, manually operated means for raising and lowering the upper dividers, their chains and the cutter bar, means for actuating the cutter bar without interfering with the vertical adjustment of the upper dividers, means for actuating the feeding chains in the dividers, such means permitting vertical adjustment of the upper dividers and their chains, manually operated means for tilting each unit forwardly or rearwardly, a conveyor carried by the frame, means for delivering the heads cut by the cutter means on to the conveyor, and an elevator for receiving the heads from the conveyor and delivering them to a wagon traveling along with the implement.

6. An implement for heading crops planted in rows comprising a wheel supported frame, a number of header units carried thereby, each unit comprising a pair of stationary lower dividers, a pair of upper vertically adjustable dividers, endless feed chains in the dividers for facilitating the passage of the plants through the spaces between the dividers, a cutter bar bridging the rear part of the space between the upper dividers, means for operating the cutter bar from one of the ground wheels without interfering with the vertical adjustment of the upper dividers, means for actuating the feed chains of the dividers without interfering with the vertical adjustment of the upper dividers, manually operated means for moving the upper dividers and their associated parts vertically, manually operated means for tilting each header unit forwardly or rearwardly, a conveyor, chutes for feeding the heads from the units on to the conveyor and an elevator for receiving the heads from the conveyor.

7. An implement for heading crops planted in rows comprising a wheel supported frame, a number of header units carried thereby, each unit comprising a pair of stationary lower dividers, a pair of upper vertically adjustable dividers, endless feed chains in the dividers for facilitating the passage of the plants through the spaces between the dividers, a cutter bar bridging the rear part of the space between the upper dividers, means for operating the cutter bar from one of the ground wheels without interfering with the vertical adjustment of the upper dividers, means for actuating the feed chains of the dividers without interfering with the vertical adjustment of the upper dividers, manually operated means for moving the upper dividers and their associated parts vertically, manually operated means for tilting each header unit forwardly or rearwardly, a conveyor, chutes for feeding the heads from the units on to the conveyor, an elevator for receiving the heads from the conveyor, and an apron connected at its upper edge with the front lower part of the upper divider and having its lower part adjacent to but separated from the lower divider.

8. An implement for heading crops planted in rows, comprising a wheel supported frame, a number of header units arranged at the front of the frame, each unit adapted to head the plants of a row, each unit comprising a post, a sleeve mounted thereon, a pair of upper dividers connected with the sleeve, a pitman operating shaft carried by the sleeve, a gear thereon, a second gear meshing with the first gear, an arm on the sleeve carrying the second gear, a shaft parallel to the post and slidably but non-rotatably connected with the second gear, a cutter bar guide bridging the space between the two dividers at the rear thereof, a cutter bar arranged in the guide, a pitman connecting the cutter bar with the crank shaft, a hand lever connected with the sleeve for permitting the same to be raised and lowered, latch means for holding the sleeve in adjusted position, means associated with the hand lever for releasing the latch means, a pair of stationary dividers arranged below the upper dividers, endless feed chains in all the dividers, means for operating the chains without interfering with the vertical adjustment of the upper dividers and means for rotating each shaft which carries the second gear.

9. An implement for heading crops planted in rows, comprising a wheel supported frame, a number of header units arranged at the front of the frame, each unit adapted to head the plants of a row, each unit comprising a post, a sleeve mounted thereon, a pair of upper dividers connected with the sleeve, a pitman operating shaft carried by the sleeve, a gear thereon, a second gear meshing with the first gear, an arm on the sleeve carrying the second gear, a shaft parallel to the post, and slidably but non-rotatably connected with the second gear, a cutter bar guide bridging the space between the two dividers at the rear thereof, a cutter bar arranged in the guide, a pitman connecting the cutter bar with the crank shaft, a hand lever connected with the sleeve for permitting the same to be raised and lowered, latch means for holding the sleeve in adjusted position, means associated with the hand lever for releasing the latch means, a pair of stationary dividers arranged below the upper dividers, endless feed chains in all the dividers, means for operating the chains without interfering with the vertical adjustment of the upper dividers, means for rotating each shaft which carries the second gear, each post being pivotally connected with the frame and each parallel shaft being formed with universal and telescopic joints, and manually operated means for tilting the post on the shaft forwardly and rearwardly.

10. An implement for heading crops planted in rows, comprising a wheel supported frame, a number of header units carried thereby, each unit comprising a pair of upper stationary lower dividers, a pair of upper vertically adjustable dividers, a post to which the upper dividers are connected, a cutter bar bridging the rear part of the space between the two upper dividers, means for actuating the cutter bar without interfering with the vertical adjustment of the upper dividers, manually operated means for adjusting said dividers vertically, each divider having a pair of sprockets therein and a feed chain passing over the sprockets, an upright shaft passing through the rear ends of each pair of upper and lower dividers, the sprocket in the lower divider being connected with the shaft while that in the upper divider is slidably but non-rotatably connected with the shaft and means for rotating the shafts to actuate the feed chains.

11. An implement for heading crops planted in rows, comprising a wheel supported frame, a number of header units carried thereby, each unit comprising a pair of stationary lower dividers, a pair of upper vertically adjustable dividers, a post to which the upper dividers are connected, a cutter bar bridging the rear part of the space between the two upper dividers, means for actuating the cutter bar without interfering with the vertical adjustment of the upper dividers, manually operated means for adjusting said dividers vertically, each divider having a pair of sprockets therein and a feed chain passing over the sprockets, an upright shaft passing through the rear ends of each pair of upper and lower dividers, the sprocket in the lower divider being connected with the shaft while that in the upper divider is slidably but non-rotatably connected with the shaft, means for rotating the shafts to actuate the feed chains, each post being pivotally connected with the frame at its lower end and each shaft for operating the feed chains having universal and telescopic joints adjacent its lower end so that the shaft can tilt with the post and manually operated means for tilting each post and its associated parts forwardly or rearwardly.

12. An implement for heading crops planted in rows, comprising a wheel supported frame, a number of header units at the front of the frame, each unit comprising cutting means and means for causing the plants to pass to the cutting means, driving means for the cutting means, driving means for the feeding means and manually operated means for rendering some of the units inactive.

13. An implement for heading crops planted in rows, comprising a wheel supported frame, a number of header units arranged at the front thereof, each unit comprising a pair of lower dividers, a pair of upper dividers, cutting means arranged between the upper dividers, means for feeding the grain passing between the dividers to the cutting means, a conveyor, chutes for causing the heads cut by the cutting means to pass on to the conveyor and chutes at the sides of the lower dividers for causing heads dropping from the outer sides of these dividers to pass to the conveyor.

14. An implement for heading crops planted in rows, comprising a wheel supported frame, a number of header units arranged at the front thereof, each unit comprising a pair of lower dividers, a pair of upper dividers, cutting means arranged between the upper dividers, means for feeding the grain passing between the dividers to the cutting means, a conveyor, chutes for causing the heads cut by the cutting means to pass on to the conveyor, chutes at the sides of the lower dividers for causing heads dropping from the outer sides of these dividers to pass to the conveyor, manually operated means for adjusting the upper dividers with their feeding and cutting means vertically.

15. An implement for heading crops planted in rows, comprising a wheel supported frame, a number of header units arranged at the front of the frame, the units being arranged in pairs, a seat attached to the frame in rear of the center of each pair of units so that an operator can attend to each pair, each unit comprising a pair of lower stationary dividers, a pair of upper vertically adjustable dividers, cutting means associated with the upper dividers, feeding means associated with each divider for causing the grain to pass to the cutting means, means for actuating the cutting means, means for actuating the feeding means, and means whereby the operator can adjust each pair of upper dividers and their associated parts vertically.

16. An implement for heading crops planted in rows, comprising a wheel supported frame, a number of header units, arranged at the front of the frame, the units being arranged in pairs, a seat attached to the frame in rear of the center of each pair of units so that an operator can attend to each pair, each unit comprising a pair of lower stationary dividers, a pair of upper vertically adjustable dividers, cutting means associated with the upper dividers, feeding means associated with each divider for causing the grain to pass to the cutting means, means for actuating the cutting means, means for actuating the feeding means, means whereby the operator can adjust each pair of upper dividers and their associated parts vertically, and means whereby the operator can tilt either one of these units forwardly or rearwardly.

17. An implement for heading crops planted in rows, comprising a wheel supported frame, a number of header units arranged at the front of the frame, manually operated means for adjusting portions of each unit vertically so that the unit can head grain for varying heights, a centrally arranged conveyor, means for delivering the heads cut by the units on to the same, means for actuating the header units and the conveyor, said conveyor being composed of an endless member formed by a number of links hingedly connected together so that the hinged parts form ribs, each link having a hole therein and rollers for supporting the endless member, each roller having lugs for engaging holes in the links for imparting movement to the endless member when a roller is rotated.

18. An implement for heading crops planted in rows, comprising a wheel supported frame, a number of header units supported at the front of the same, each unit comprising an upright post pivotally connected at its lower end to the frame, a pair of lower dividers, pair of upper dividers movably supported from the post, a link pivotally connected with a part of the frame, means for pivotally and yieldingly connecting the upper end of the link with the outer end of each lower divider, a link connecting each lower divider with the outer end of each upper divider, said link being pivotally connected with the lower divider, and pivotally and yieldably connected with the upper divider, cutter means associated with the upper dividers, means for actuating the cutting means, means for adjusting the cutting means and the upper dividers vertically, and manually operated means for tilting the posts and their associated parts forwardly or rearwardly.

19. An implement for heading crops planted in rows, comprising a wheel supported frame, a number of header units supported at the front of the same, each unit comprising an upright post pivotally connected at its lower end to the frame, a pair of lower dividers, a pair of upper dividers movably supported from the post, a link pivotally connected with a part of the frame, means for pivotally and yieldingly connecting the upper end of the link with the outer end of each lower divider, a link connecting each lower divider with the outer end of each upper divider, said link being pivotally connected with the lower divider, and pivotally and yieldably connected with the upper divider, cutter means associated with the upper dividers, means for actuating the cutting means, means for adjusting the cutting means and the upper dividers vertically, manually operated means for tilting the posts and their associated parts forwardly or rearwardly, endless feeding chains carried by the dividers, means for actuating the same and each lower divider being of casing-like shape with its inner side open to expose the feeding chain.

In testimony whereof I affix my signature.

MARVIN STILES.